US005604801A

United States Patent [19]
Dolan et al.

[11] Patent Number: 5,604,801
[45] Date of Patent: Feb. 18, 1997

[54] PUBLIC KEY DATA COMMUNICATIONS SYSTEM UNDER CONTROL OF A PORTABLE SECURITY DEVICE

[75] Inventors: George M. Dolan, Charlotte, N.C.; Christopher J. Holloway, Woking, England; Stephen M. Matyas, Jr., Poughkeepsie, N.Y.

[73] Assignee: International Business Machines Corporation, Armonk, N.Y.

[21] Appl. No.: 383,129

[22] Filed: Feb. 3, 1995

[51] Int. Cl.⁶ ........................................... H04L 9/00
[52] U.S. Cl. .................................. 380/21; 380/49
[58] Field of Search .......................... 380/21, 23, 24, 380/25, 30, 44, 49

[56] References Cited

U.S. PATENT DOCUMENTS

| | | | |
|---|---|---|---|
| 4,969,188 | 11/1990 | Schobi | 380/23 |
| 5,111,504 | 5/1992 | Esserman et al. | 380/21 |
| 5,142,578 | 8/1992 | Matyas et al. | 380/21 |
| 5,200,999 | 4/1993 | Matyas et al. | 380/25 |
| 5,237,611 | 8/1993 | Rasmussen et al. | 380/21 |
| 5,265,164 | 11/1993 | Matyas et al. | 380/302 |
| 5,412,721 | 5/1995 | Rager et al. | 380/21 |
| 5,513,261 | 4/1996 | Maher | 380/23 |

*Primary Examiner*—Thomas H. Tarcza
*Assistant Examiner*—Pinchus M. Laufer
*Attorney, Agent, or Firm*—Kenneth A. Seaman

[57] ABSTRACT

A data communications system is described in which messages are processed using public key cryptography with a private key unique to one or more users (150) under the control of a portable security device (120), such as a smart card, held by each user, the system comprising: a server (130) for performing public key processing using the private key. The server (130) stores, or has access to, the private key for the, or each, user in encrypted form only. The private key is encrypted with a key encrypting key and each security device (120) comprises means for storing or generating the key encrypting key and providing the key encrypting key to the server (130). The server comprises secure means (360) to retrieve the encrypted private key for the user, decrypt the private key using the key encrypting key, perform the public key processing using the decrypted private key, and delete the decrypted private key after use.

11 Claims, 11 Drawing Sheets

PUBLIC KEY DATA COMMUNICATIONS SYSTEM UNDER CONTROL OF A PORTABLE SECURITY DEVICE

BACKGROUND OF THE INVENTION

1. Field of the Invention

The invention relates to dam communications systems and, more particularly, to the secure processing of messages therein using public key cryptography. The invention finds particular, though not exclusive, application to the generation of digital signatures.

2. Description of the Related Art

Public key cryptographic algorithms are widely used to certify the origin of or ensure the security or integrity of messages .in data communications systems. Various types of such algorithms exist of which one well known variant is the RSA algorithm. A general introduction to public key cryptography and the RSA algorithm can be found in: Meyer and Matyas 'Cryptography—A New Dimension in Computer Data Security', pages 32–48, Wiley 1982. These algorithms have some distinct advantages over the more traditional symmetric key algorithms. In particular, they provide the ability for a key to be published or certified so that any independent third party can receive and verify a message without reference to a central authority.

One example of the use of public key cryptography in data communications is in the generation of digital signatures. The principle behind these techniques is the creation of a public digital value—the signature—which depends on a message to be transmitted and the signing user, so the receiving user can be sure that the sending user, and no other user, could create the signature value, and that the user created the signature value for this message and no other.

In such systems, the party signing a message has a private key for which there exists a corresponding public key. The public key is available so that anyone can use it to decrypt data which the signer encrypts using the private key, but no-one can create such encrypted data without access to the private key.

Typically, the signer produces a hash value from the message using a strong hash algorithm, such that the chance of another message resulting in the same value is extremely low. The means of calculating this value is public knowledge but there is no feasible way to determine a different message which results in the same value. The signer encrypts the value using the private key, and sends the message and the encrypted value to the recipient.

The recipient can use the public key to decrypt the value, and can test whether the calculation on the message produces the same value. If it does, this satisfies the recipient that the message was the one signed because there is no feasible way to calculate another message which produces the same value. The recipient can also be sure that the signer did indeed sign the message because no-one can create the encrypted value without access to the private key.

However, such public key encryption schemes are computationally intensive and demand substantially higher computing resources, such as processing power and memory requirements, for encryption and decryption than symmetric key schemes.

In many applications of public key cryptography to data communications, the message must be processed under the control of a portable security device, such as a smart card, PCMCIA card or laptop computer, carried and presented by a user. Whilst methods have been proposed to enable messages to be signed with much less computational effort than they can be verified, such as in the US Department of Commerce/National Institue of Standards and Technology (NIST) Digital Signature Standard published in Federal Information Processing Standard (FIPS) 186, May 19, 1994, the situation remains that, using current technology, in many cases it is not practical or cost-effective to provide such portable security devices with the necessary processing power or memory to perform sufficiently strong public key processing in an acceptable time.

Various methods have been proposed in the prior art to enable such a security device to perform the public key processing with the aid of a powerful server computer, without requiring the security device to reveal the secret key to the server. Examples of these techniques can be found, for example, in: Laih et al, 'Two efficient server-aided secret computation protocols based on the addition sequence', Advances in Cryptology—Asiacrypt 91 Proceedings 1993 pp 450–459.

Whilst these methods go some way to alleviating the problem, they suffer from several disadvantages inherent in storing the secret key on a portable and low cost device.

First, it is possible the device may be probed to obtain the secret key.

Secondly, if the signer's private key is compromised, a different user might use it to process messages. In this circumstance, a means is required to revoke the secret key so the unauthorised user can no longer use it. Since the security devices are not connected to the system at all times and could be reconnected to the system at any point, withdrawing or preventing use of the secret keys is, in practice, very difficult. Typically this has been achieved using various types of user blacklists. However, there are many practical difficulties associated with controlling, updating and verifying the authenticity of such lists, particularly over widespread networks.

Furthermore, since some smart card implementations which make use of public key algorithms for signing purposes cannot generate the user's public and private key pair within the smart card, there are potential security exposures when the key is initially loaded into the security device. This is because the key generation algorithm is quite complex, more so than the encryption and decryption functions. Therefore if it is required to store the secret key on the card then it may also be required to generate the secret key off the card and to enter it onto the card during an initialisation process. This initialisation process inevitably exposes the key to some degree.

SUMMARY OF THE INVENTION

This invention is directed to the problem of providing a secure method of enabling messages to be processed using public key processing on behalf of the authorised holder of a portable security device, such as a smart card, in such a manner that it can be shown that only the authorised holder of the security device could have authorised the processing of a particular message, without requiting the public key algorithm to be performed by the security device, without having to store the private key in the security device, and without requiring the key generation process to be performed by the security device.

To solve this problem, the invention provides a communications system in which messages are processed using public key cryptography with a private key unique to one or more users under the control of a portable security device held by the, or each, user, the system comprising: a server for performing public key processing using the private key, the server being adapted for data communication with the portable security device; characterised in that the server comprises, or has access to, data storage means in which is stored in a secure manner the private key for the, or each, user in encrypted form only, the private key being encrypted with a key encrypting key, the server comprising secure processing means to receive a message to be processed from the user, retrieve the encrypted private key for the user, decrypt the private key using the key encrypting key, perform the public key processing for the message using the decrypted private key, and delete the key encrypting key and decrypted private key after use, and in that each security device comprises means for storing or generating the key encrypting key and providing the key encrypting key to the server and means for specifying a message to be processed, the system being arranged so that communication of at least the key encrypting key to the server is secure and so that the server can only use the key encrypting key to process the message specified by the user.

A secure server is therefore provided to perform the public key algorithm. However, the server has access only to an encrypted form of the private key. A portable security device controls the public key processing by providing the server with a key to enable the server to decrypt the private key, use it, and delete the private key after use.

The secure communication of the key encrypting key to the server can be accomplished in a number of ways. In preferred embodiments, the key encrypting key is encrypted using a key derived from a second key encrypting key stored in the security device for transmission between the security device and the server and the server has access to the second key encrypting key. In this way, communication of the key encrypting key to the server is secured by cryptographic means. In other embodiments, appropriate physical security of the communication channel between the security device and the server could be used.

Similarly, there are a number of ways of ensuring that the server can only use the key encrypting key to process the message provided by the user. In preferred embodiments, the key encrypting key is cryptographically associated with a message to be processed and the secure processing means comprises means to verify the association of the key encrypting key with the message and is arranged only to make use of the key encrypting key to process that message. Again, in other embodiments, appropriate physical security might be provided to ensure this.

In one embodiment, the security device can encrypt the key encrypting key for transmission to the server using a key derived from the message to be signed, thereby cryptographically associating the key encrypting key with the message. The server comprises secure means for extracting the key from the message and decrypting the key encrypting key. In this way, data transmitted by the security device can be used to decrypt the secret key for the original message only. It is not possible to intercept the transmission to the server and substitute the message for one not authorised by the user.

It will be appreciated that there are many other ways of cryptographically binding the key encrypting key and the message. For example, a message authentication code which could be verified by the server might be derived from a combination of the message and the key.

In one embodiment of the invention, the key encrypting key is stored in the security device as a reversible function of a password or PIN, the security device comprising means to receive the password from the user and being able to recover the key encrypting key using the reversible function. This arrangement ensures that the data stored in a lost or stolen security device is not sufficient to enable a message to be generated which will permit the server to obtain access to the secret key.

For convenience, the key encrypting key can be a one-way function of the private key. In this case, the server can check the recovered value of the private key by deriving therefrom the key-encrypting key and comparing the derived value thereof with the value received from the security device.

In further embodiments of the invention, the key encrypting key can be a reversible function of a key stored in the security device and a random number, the server comprising means to provide the random number to the security device on request.

Preferably, in such embodiments, the server is arranged to reencrypt the private key each time it is used using a new random number, and to provide the new random number to the security device the next time it is required to perform public key processing for a user.

The use of a random number ensures that the process makes use of a new key value for each transaction even if the messages are identical, thereby improving security still further.

The invention also provides a portable security device, which can be a smart card, and a server for use in such a system.

Viewed from another aspect, the invention also provides a method for processing messages using public key cryptography with a private key unique to one or more users under the control of a portable security device held by the, or each, user, in a system comprising: a server for performing public key processing using the private key, in which system the server is adapted for data communication with the portable security device; characterised by the steps of (a) storing in the server, or providing the server with access to, the private key for the, or each, user in encrypted form only, the private key being encrypted with a key encrypting key;

(b) storing or generating in the security device the key encrypting key and providing the key encrypting key to the server in a manner such that at least the key encrypting key is secure in communication to the server; and, in a secure environment in the server:

(c) receiving a message to be processed specified by the user;

(d) retrieving the encrypted private key for the user;

(e) verifying that the message was that specified by the user;

(f) decrypting the private key using the key encrypting key;

(g) performing the public key processing for the message using the decrypted private key; and (h) deleting the decrypted private key and the key encrypting key after use.

BRIEF DESCRIPTION OF THE DRAWINGS

Embodiments of the invention will now be described, by way of example only, with reference to the accompanying drawings, wherein.

DETAILED DESCRIPTION OF PREFERRED EMBODIMENTS OF THE INVENTION

Figure 1:
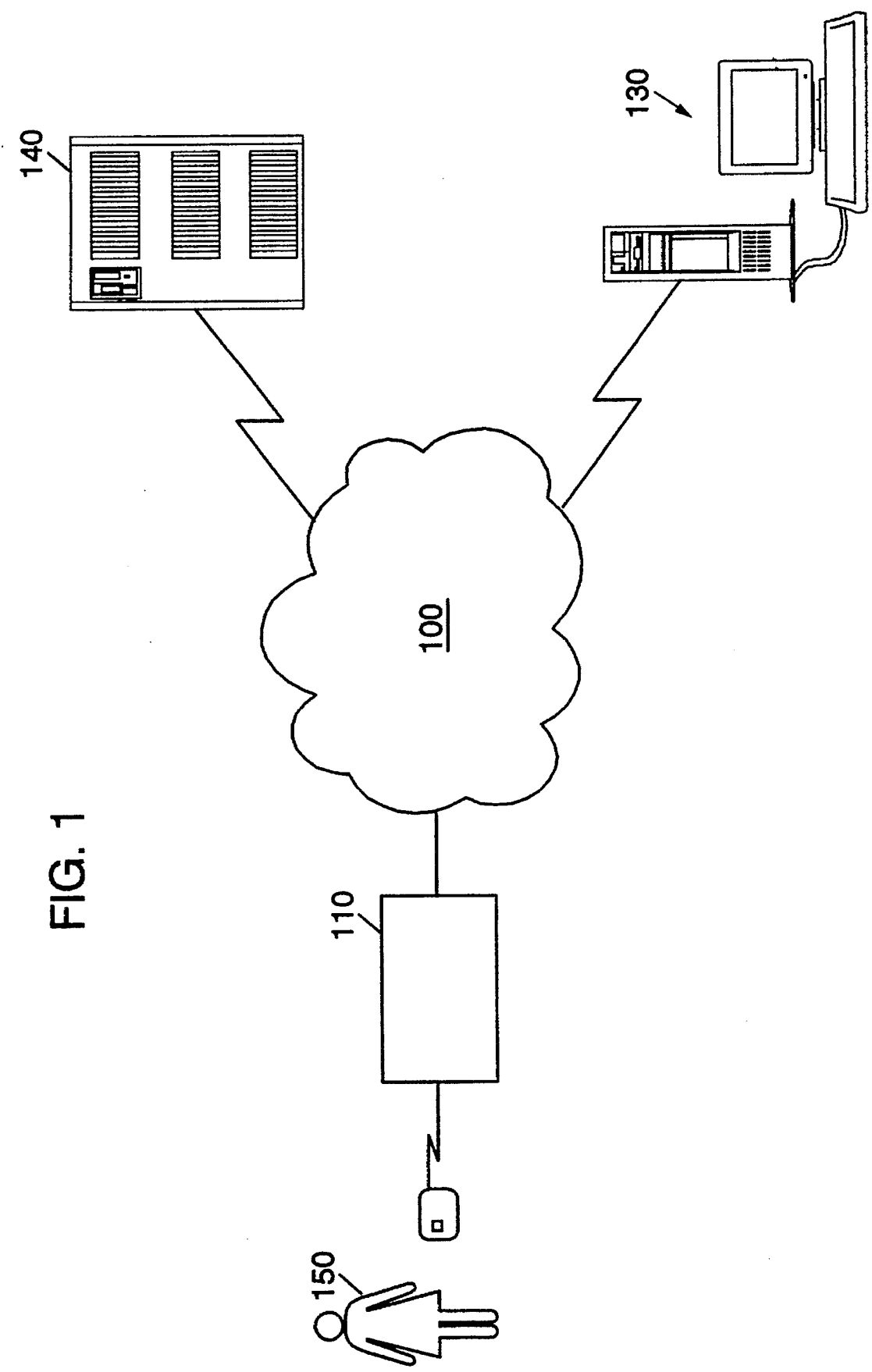
FIG. 1 shows a communications system.

Referring to FIG. 1, there is shown a communications system which comprises communications network 100 which may be any conventional type of local area network (LAN) or wide area network (WAN) or any combination of the two. Connected to the communications network 100 is workstation 110 incorporating a smart card reader for operating in conjunction with smart card 120. Also connected to network 100 are server computer 130 and an intended recipient of a message, shown for the sake of example as mainframe computer 140. Workstation 110 could, for instance, be a point of sale terminal at a retail outlet. Smart card 120 is in the possession of user 150. The system is arranged so that user 150 can certify a message, such as a debit instruction for the user's account, generated in workstation 110 using a digital signature. The generation of the digital signature in the system is performed by server 130 under the control of smart card 120.

In the following, the notation EKEY(A) will be used to indicate the quantity A encrypted using a key KEY. This notation will be used for both public key and symmetric cryptographic algorithms. The symbol + represents an invertible combination such as an XOR operation or addition or multiplication mod p, where p is a non-secret prime number.

It will be understood from what follows that, whilst in these embodiments server 130 is assumed, for clarity, to be a separate computer from workstation 110, the function of server 130 could equally be performed by a process running in workstation 110 or in mainframe computer 140. Furthermore, whilst the embodiments are, for clarity described in terms of a single server 130, it is envisaged that other embodiments may include a plurality of such servers.

Figure 2:
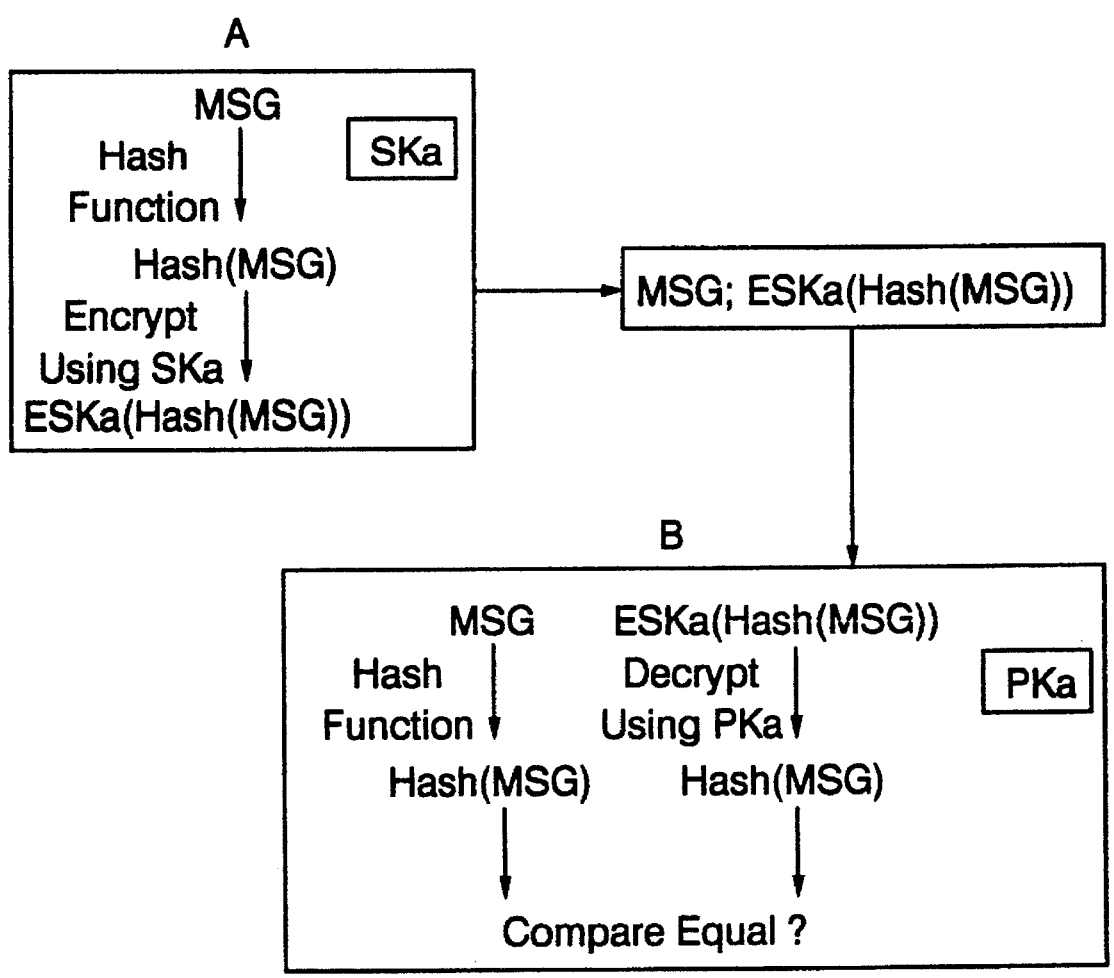
FIG. 2 illustrates the generation of a digital signature.

FIG. 2 illustrates a simple example of the principles behind the creation and use of digital signatures using public key cryptography. It will be understood that this type of digital signature is only one among many techniques for the generation of digital signatures using public key cryptography any of which may equally be employed in other embodiments of the invention.

FIG. 2 shows two users who wish to communicate with each other and to be sure of the identity of the other. Each user has a public and private key pair PK and SK. Each user shares their public key with each other user. Normally, each user would keep secret their respective private key, but the public keys would be available for whoever wished to communicate with them.

Suppose user A wishes to send a message MSG to user B over a data communications network. A digital signature is generated from the message by first generating a hash value of the message using a strong hashing function, of which there are many known types. An example of a strong hash algorithm suitable for use in calculating digital signatures is described in U.S. Pat. No. 4,908,861. The particular hashing function involved is assumed to be known to B. This hash value is then encrypted using the secret key of A to generate a digital signature ESKa(Hash(MSG)). The message is then transmitted to user B along with the digital signature. User B can verify the authenticity of the message by decrypting the digital signature using the public key PKa and comparing the value obtained with a hash value obtained from the message.

In practice, the integrity of the public keys PKa would be certified by a third party whose role would be to certify keys. This would serve to satisfy B that PKa was indeed the public key associated with A and not with anybody else. Such certification and distribution of public keys is well known in the art and will not be further described herein. A discussion of these certificates can be found in CCITT Recommendation X.509 Directory Services (1988).

Figure 3:
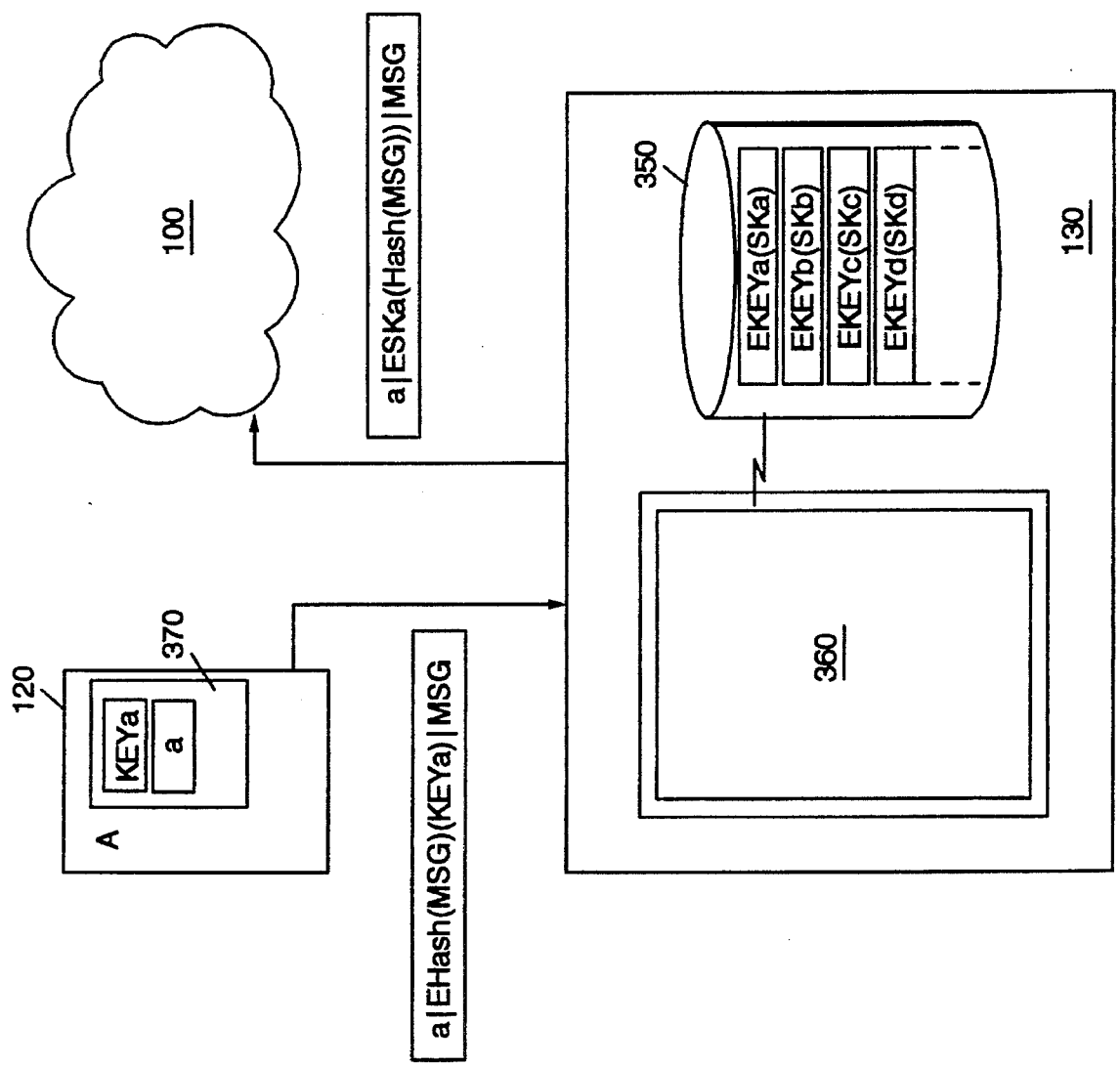
FIG. 3 is a schematic diagram showing a simple first embodiment of the invention.

FIG. 3 is a schematic diagram showing the operation of a simple first embodiment of the invention. Such an embodiment would be useful if the communications between the smart card and the server is separately secured by for example either physical or cryptographic means so that the keys and messages exchanged are protected. A variety of means are known to the art, such as the use of secure cabling, or the use of data encryption and authentication. In such a high security environment, the smart card would act as an additional control over the use of the server.

Server 130 includes a secure cryptographic environment 360, such as that provided by the IBM 4755 cryptographic adapter, and a disk storage device 350. The IBM 4755 cryptographic adapter stores cryptographic values securely on the storage device 350 under the protection of an encryption key, the local Master Key held within the secure cryptographic environment 360. The IBM 4755 cryptographic adapter provides an encapsulated and tamper-resistant hardware environment for performing such cryptographic tasks under the control of microcode resident therein. It is described in more detail in IBM Systems Journal, Vol 30, No 2 1991, pp 206–229.

The secret keys SK associated with a number of users A, B, C, D . . . are stored securely in storage device 350 in encrypted form. They are encrypted using a conventional symmetric cryptographic algorithm, such as the well known DES algorithm, using a user-specific key KEY. The user-specific key for user A, denoted KEYa, is stored in storage 370 in smart card 120 along with information identifying the user—designated A in FIG. 3—which will enable the corresponding encrypted secret key to be retrieved from storage device 350.

Figure 4A:
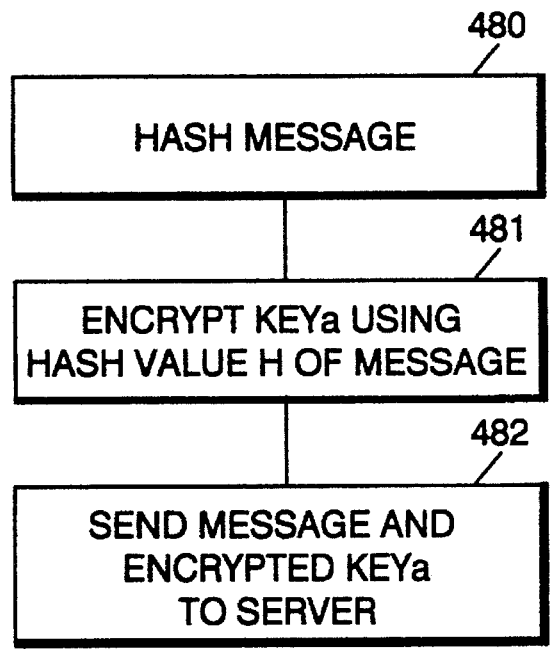
FIGS. 4a and 4b illustrate processes carried out in the smart card and server in the first embodiment.

The process carried out by smart card 120 is illustrated in FIG. 4a. When user A wishes to send a message MSG and an associated digital signature, smart card 120 generates a hash value H of message MSG in step 480 and encrypts in step 481 user-specific key KEYa using a conventional symmetric algorithm, such as DES, with the hash value H as the key. This encrypted value of the key is sent along with the message and the information identifying the user across the network to server 130 in step 482.

Figure 4B:
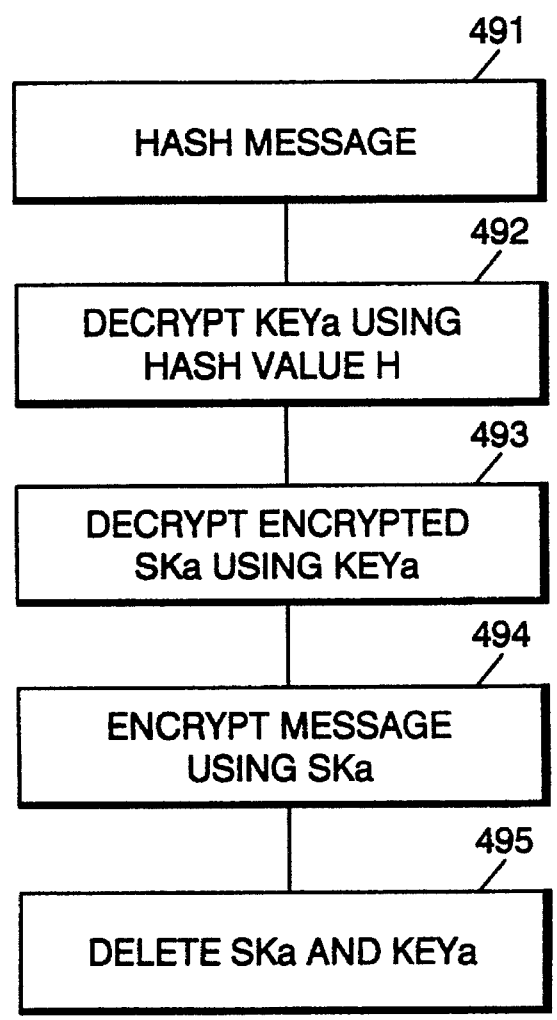

The process carried out by server 130 is illustrated in FIG. 4b. Server 130 regenerates the hash value H from the message in step 491 and decrypts the user-specific key KEYa in step 492. This KEYa is used in the secure environment to decrypt and temporarily store the decrypted value of the secret key of the user SKa in step 493. This decrypted secret key is then used, within the secure environment 360, to generate the digital signature for the message in step 494, which is then either sent out directly by server 130 to the intended recipient of the message, or returned to smart card 120 for subsequent transmission. Finally, KEYa, the message, the hash value and SKa are erased within secure environment 360 in step 495.

Since the server is provided with secure cryptographic environment 360 and can therefore be controlled, assurance can be provided that the secret key SKa was used to sign only the original message, and that the message, its hash value H, SKa and KEYa have indeed been erased. The property of non-repudiation has therefore been preserved. Furthermore, server 130 can be maintained on-line in a systems management environment. If it is desired to rescind the ability of user 150 to generate digital signatures this can be easily achieved by deleting the encrypted value of SKa from storage 350. No access is required to the contents of smart card 120, which might not be physically available at the time it is desired to rescind this authority.

Figure 5:
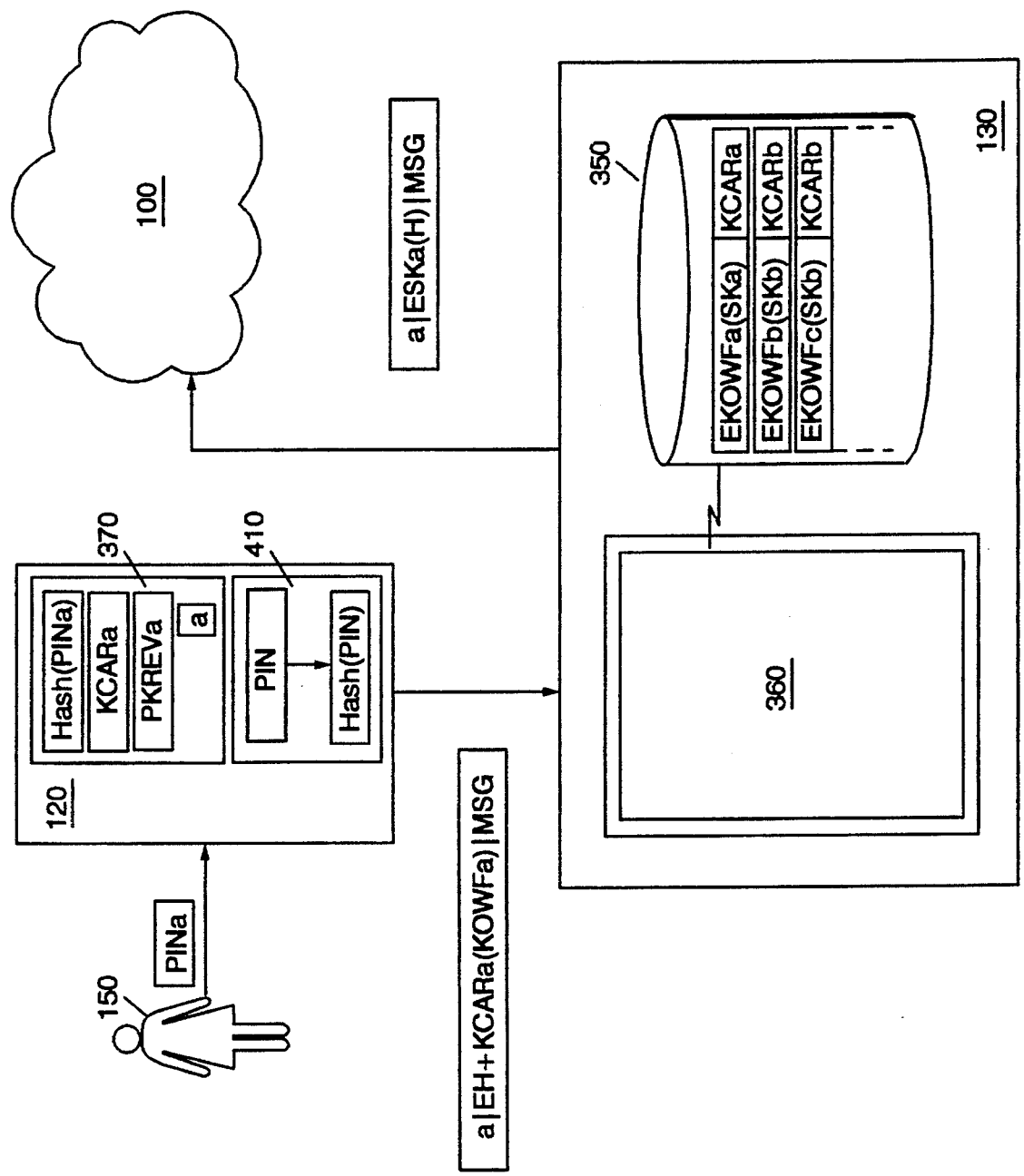
FIG. 5 illustrates enhancements to the system of FIG. 3.

FIG. 5 is a schematic diagram illustrating an enhanced version of the first embodiment of the invention. The mode of operation illustrated in FIG. 3 is modified in a number of ways.

First, user 150 has a Personal Identification number (PIN) which is used to ensure that only user 150 can make use of smart card 120. This is achieved in this embodiment by arranging the system so that the key with which the user's secret key is encrypted when stored in server 130 is a combination, in this embodiment an XOR function denoted by +, of data stored on the card, represented as PKREVa in FIG. 5, and the PIN, PINa in FIG. 5.

The authenticity of the PIN can be checked by the smart card by storing therein a value which is a one way function—in this case a strong hash—of the PIN. In this way, the PIN can be checked by regenerating the hash of the PIN supplied by the user and checking this against the value stored in the card. This is illustrated by process 410 of FIG. 5.

Figure 6A:
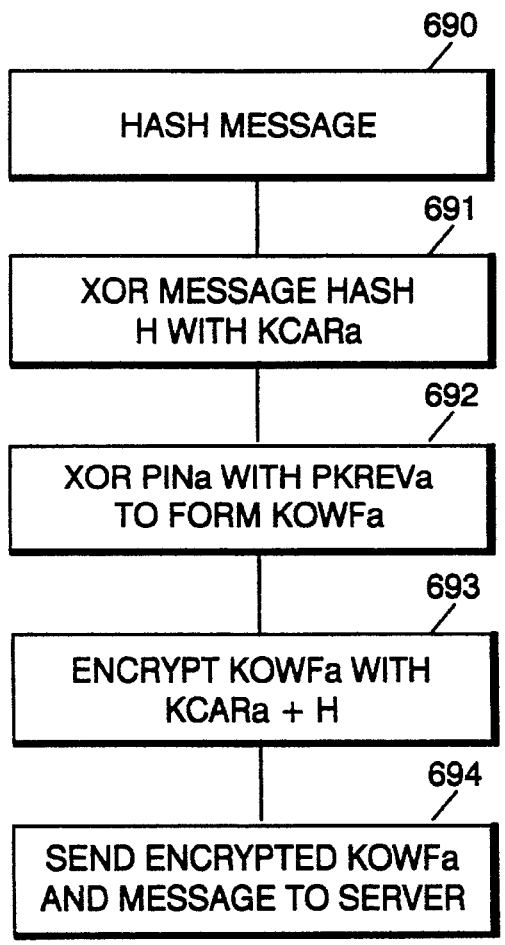
FIGS. 6a and 6b illustrate processes carried out in the smart card and server in the enhanced first embodiment.

PKREVa is a reversible function of the PIN and a one-way function—in this case a strong hash—of the users secret key SKa. This one way function of the users secret key is denoted KOWFa in FIG. 5. The reversible function can, for example, be a combination such as an XOR operation, or addition or multiplication mod p, where p is a non-secret prime number. In this way, the one-way function of the secret key KOWFa can be recovered using PINa. Note that using this approach the user may change his PIN without reference to the server. This can be done by the smart card using PKREVa with the old and new PINa to recalculate a new value of PKREVa using the following relation: PKREVold)+PINa(old)+PINa(new)=PKREVa(new). The process carried out in smart card 120 is illustrated in FIG. 6a. When user a wishes to sign a message MSG, the PIN and the message are provided to the smart card, which generates a hash value H of the message in step 690 and combines this with the data stored on the card KCARa in step 691 to form a transient, but complete, key encrypting key which is valid for one message only. The smart card also recovers KOWFa from PINa and PKREVa in step 692 and enciphers KOWFa in step 693 using the transient key encrypting key derived from the message and KCARa. Note that the smart card stores neither the PIN nor the key used to encrypt the secret key. Therefore, disclosure of the data stored on a lost or stolen smart card does not enable use of the secret key. Smart card 120 creates a request 440 containing information identifying the user A, the enciphered value of KOWFa and the message. Request 440 is transmitted to server 130 over the network in step 694.

Figure 6B:
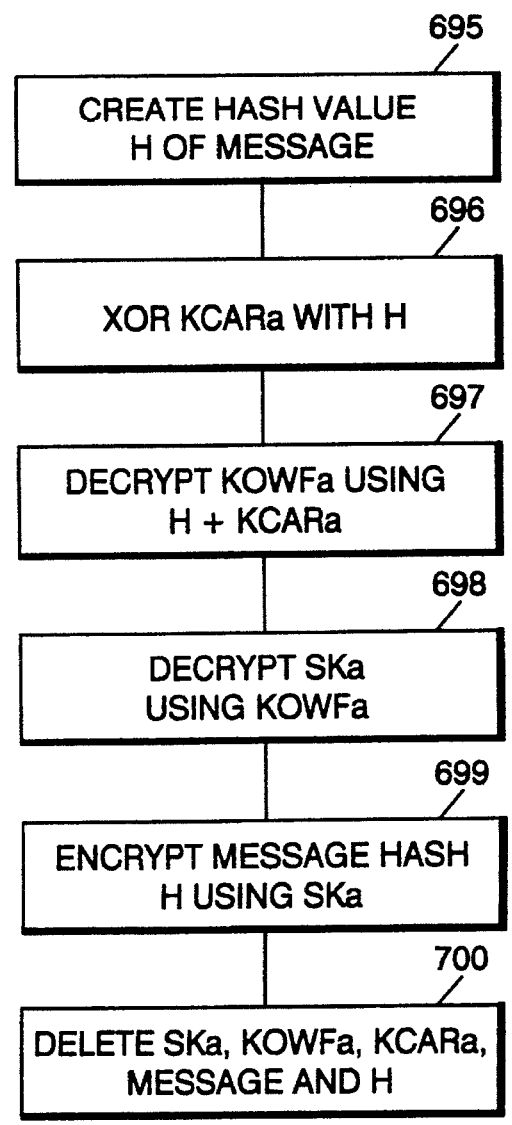

The process carried out in server 130 is illustrated in FIG. 6b. Server 130 receives the request either immediately or at some future time, generates a hash value H of the message in step 695, regenerates the transient key from the message hash value H and KCARa in step 696, which has been retrieved in encrypted form from storage 350 and decrypted into clear form. The transient key is used to recover KOWFa in step 697 and, in turn, KOWFa is used to recover the user's secret key SKa in step 698.

The values KCARa, KCARb, etc are stored in storage device 350 with confidentiality since otherwise they might be used to decrypt SKa by an adversary having intercepted transmission 440.

In addition, the validity of the recovered value of SKa is checked by using the one way function to generate KOWFa from the recovered secret key and comparing this value with the value of KOWFa recovered from request 440.

The recovered value of SKa is used within the secure cryptographic environment to generate the digital signature in step 699 in the manner described above. As before, the recovered values of SKa and other keys are erased from the secure cryptographic environment 360 after use in step 700.

Again, since server 130 includes the secure cryptographic environment 360 and is controlled, assurance can be provided that only the original message was signed and that the secret key has indeed been erased from within the secure cryptographic environment 360. If it is desired to rescind the ability of user 150 to generate digital signatures this can be achieved by deleting either the encrypted value of SKa or KCARa from storage 350.

Figure 7:
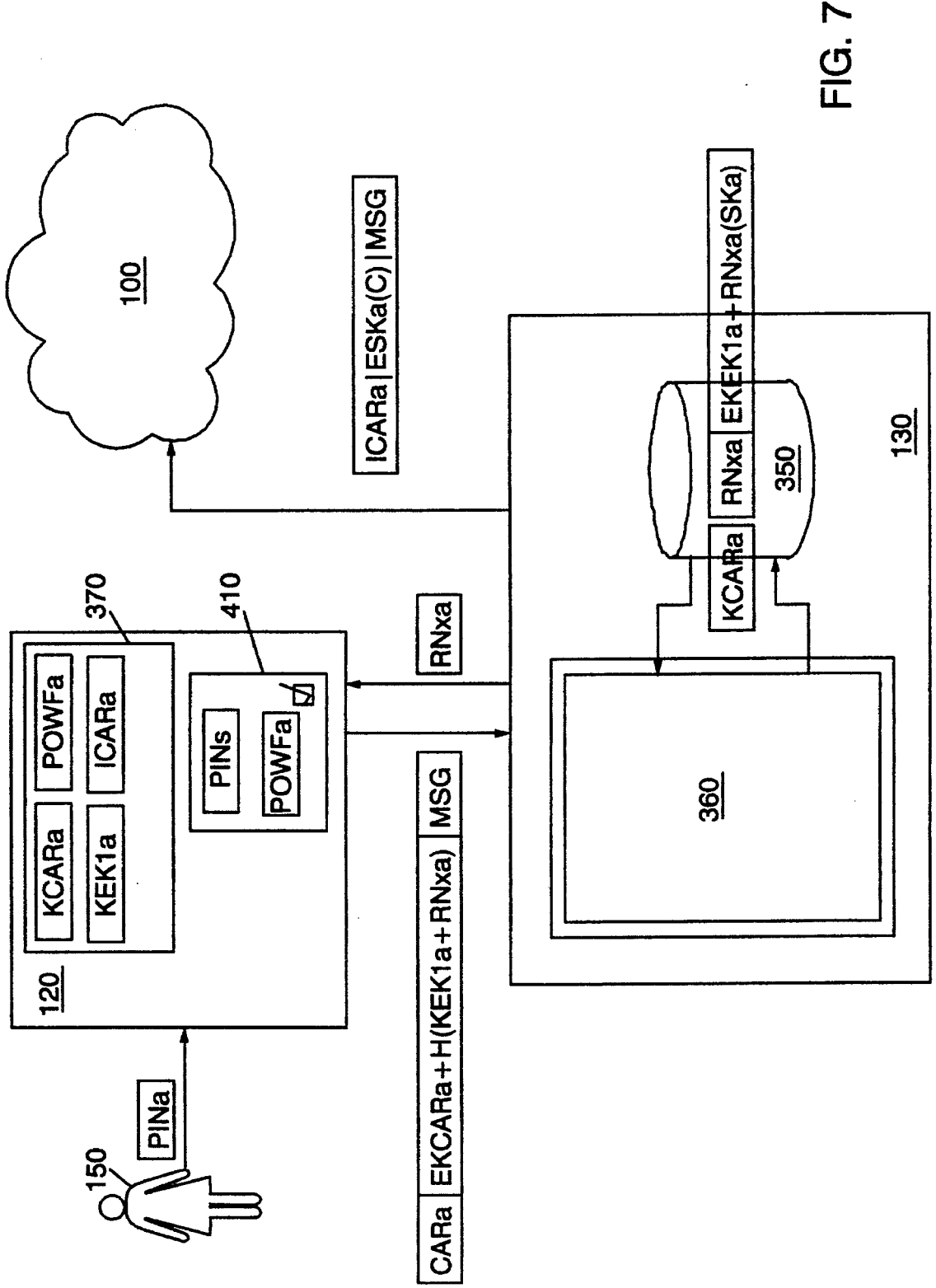
FIG. 7 is a schematic diagram illustrating a second embodiment of the invention.

FIG. 7 is a schematic diagram illustrating a second embodiment of the invention. In this embodiment smart card 120 associated with user A stores two key encrypting keys KEKla and KCARa. Server 130 stores KCARa and one of a series of random numbers RNxa along with the encrypted form of the user's secret key. In this embodiment, the key used to encrypt the user's secret key is a combination of KEKla with RNxa—denoted KEKla+RNxa in FIG. 7.

Figure 8:
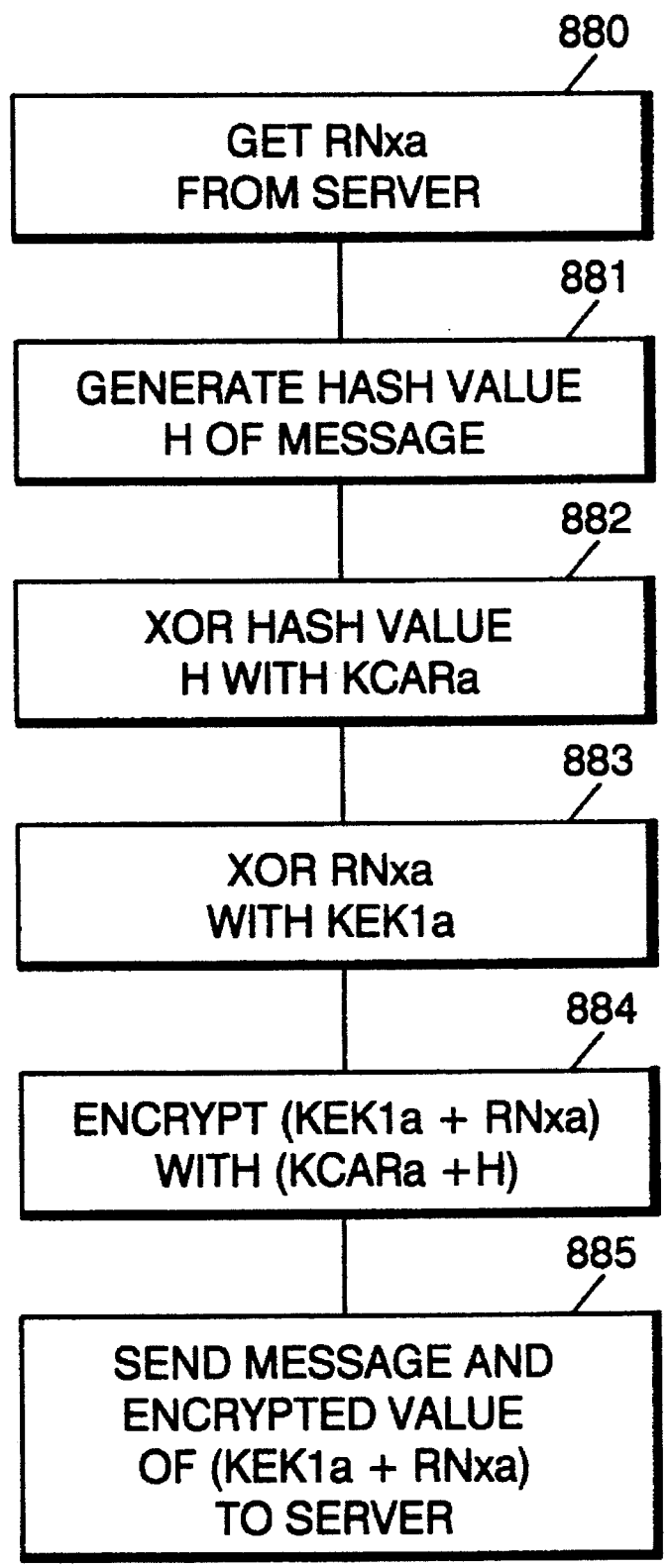
FIG. 8 illustrates the process carried out in the smart card in the second embodiment of the invention.

The process carried out by smart card 120 in this embodiment of the invention is illustrated in FIG. 8. As before, a user 150 prepares a message MSG to be signed using their corresponding secret key SKa. User 150 has a PIN— denoted PINa in FIG. 7 which is entered and provided to smart card 120 via a suitable interface (for example a keyboard, not shown). As before, smart card 120 authenticates user 150 by generating a hash of PINa and comparing this with a stored value POWFa using process 410.

In step 880, smart card 120 sends a message to server 130 indicating that a message is to be signed. Server 130 responds by providing a current one of a series of random numbers RNxa to smart card 120.

Smart card 120 generates a hash value H of the message MSG in step 881 then, calculates the key H+KCARa in step 882. The value KEKla+RNxa is calculated in smart card 120 in step 883 and encrypted in step 884 using the key H+KCARa.

Smart card 120 then passes a request containing card id ICARa, the encrypted value of KEKla+RNxa, and the message over the network to server 130 in step 885. Id ICARa enables the server to locate the keys associated with user A. The protocol could also include the passing of RNxa back to server 130 which would allow a consistency check to be performed.

Figure 9:
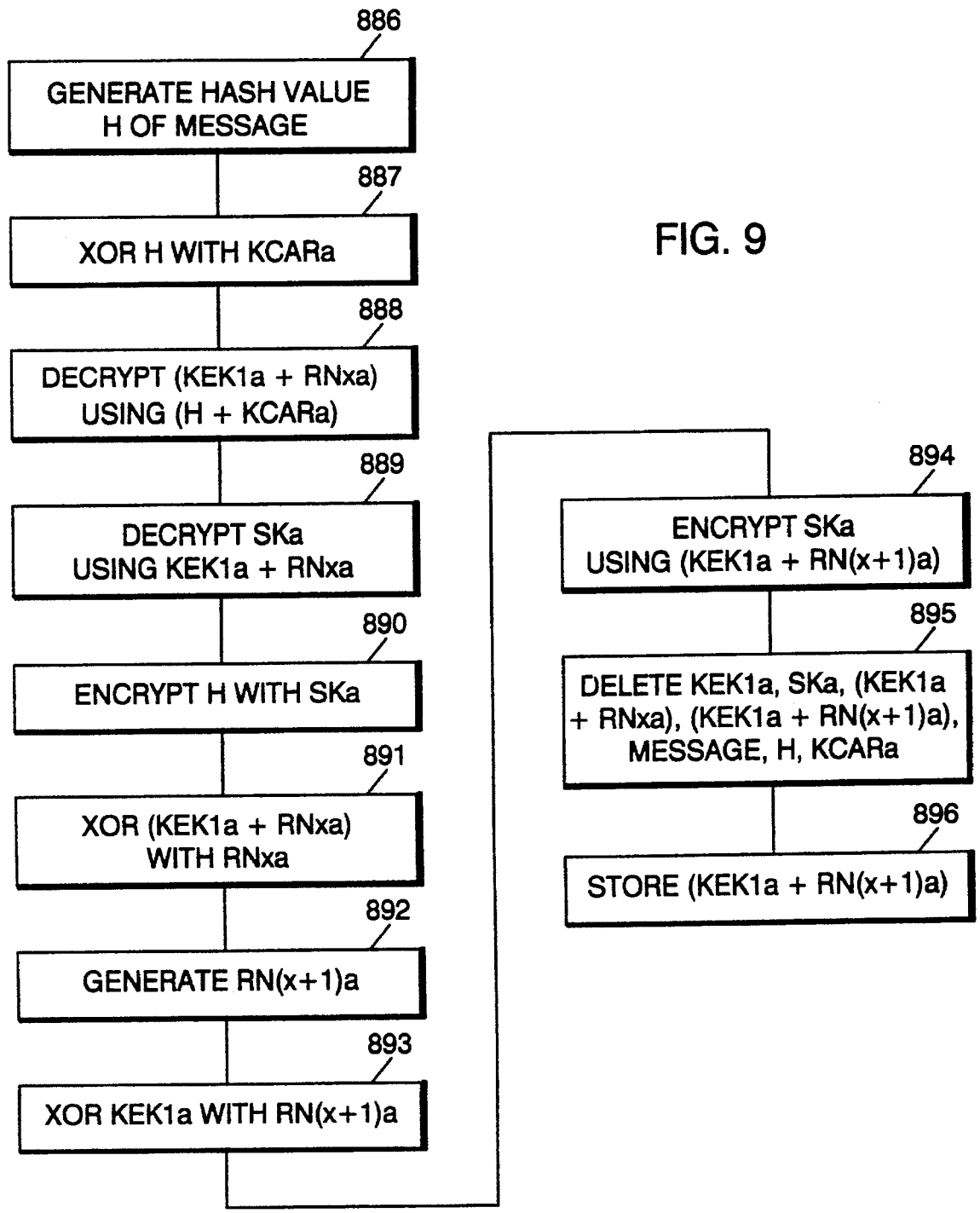
FIG. 9 illustrates the process carried out in the server in the second embodiment.

The process carried out in server 130 is illustrated in FIG. 9. In step 886, server 130 regenerates the hash value H from the message and computes the key H+KCARa in step 887. Using this key, server 130 recovers KEKla+RNxa in step 888 by decrypting EKCARa+H(KEKla+RNxa) with KCARa+H and recovers the user's secret key SKa in step 889 by decrypting EKEKla+RNxa(SKa) with KEKla+RNxa. The message is then signed as before in step 890.

Server 130 then calculates KEKIa in step 891 by recombining a securely stored value of RNxa with KEKla+RNxa. A new random number RN(x+1)a is then generated in step 892 for use in the next invocation of the algorithm. RN(x+1)a is combined with KEKla in step 893 and used to reencrypt the user's private key in step 894 prior to storage in storage device 350 in step 896. RN(x+1)a is also stored securely in storage device 350, replacing RNxa. The clear value of KEKla in secure environment 360 is then deleted in step 895, along with the clear value of the user's private key SKa, KEKla+RNxa and KEKla+RN(x+1)a.

This arrangement prevents the authorization quantity EKCARa+H(KEKla+RNxa) along with the message MSG being used to generate another digital signature, by extracting the variant key KEKla+RNxa.

Figure 10:
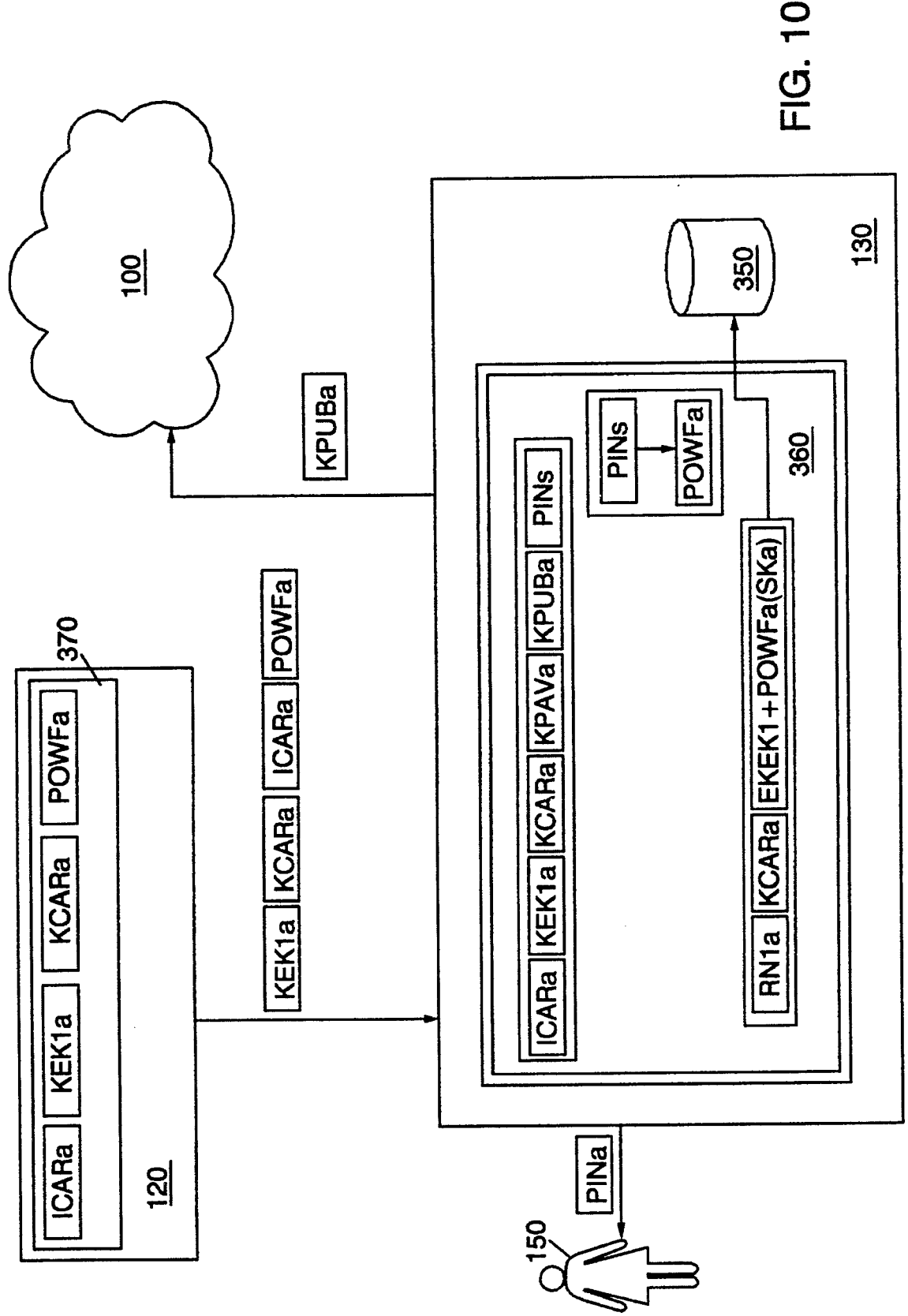
FIG. 10 is a schematic diagram showing the initialisation procedures for the second embodiment.

FIG. 10 is a schematic diagram showing the initialisation procedures used in the embodiment of FIG. 7.

Figure 11:
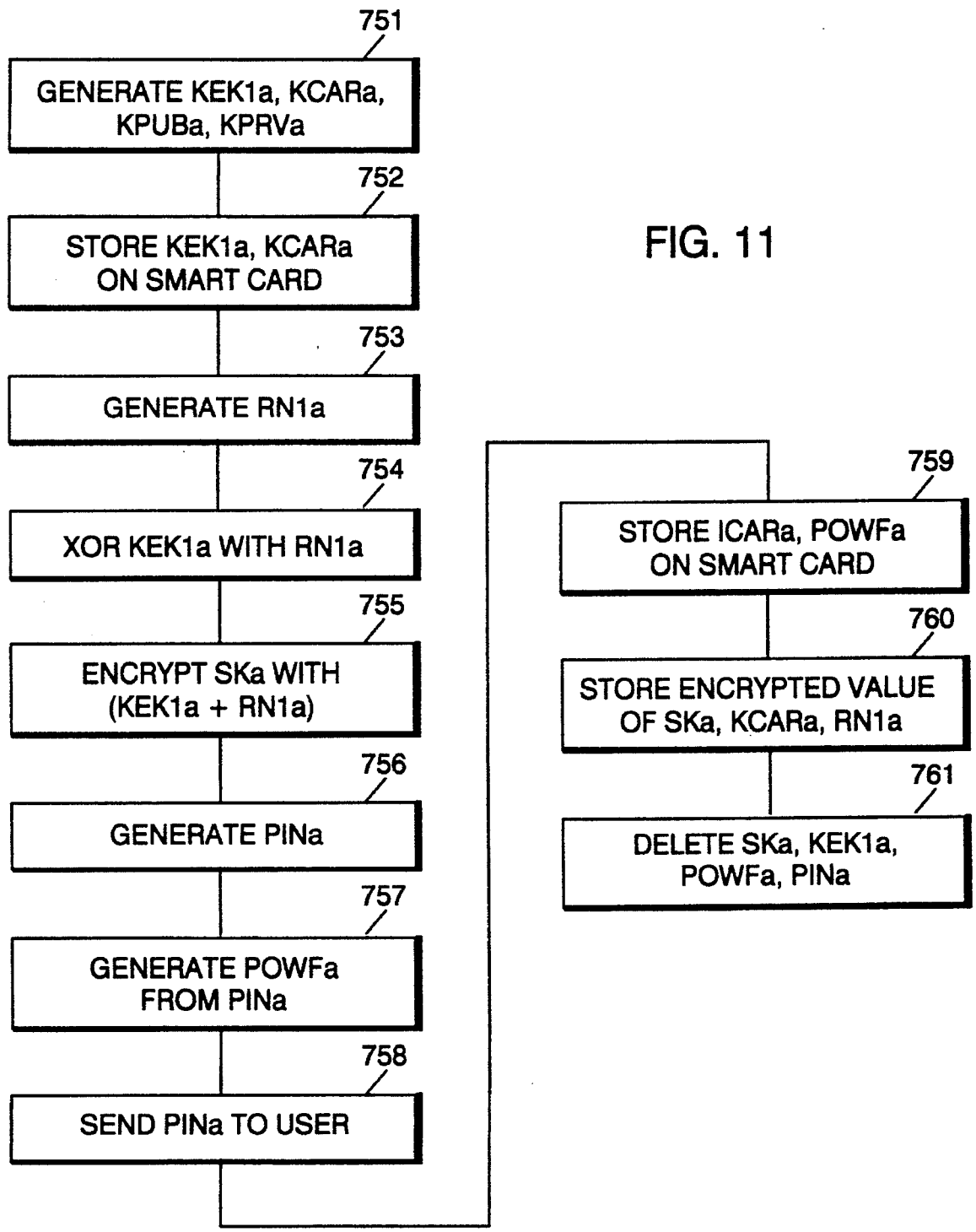
FIG. 11 is a flow diagram illustrating the initialisation procedures for the second embodiment.

The initialisation process carried out is illustrated in FIG. 11. Server 130 generates in step 751 the following cryptographic keys for user A.
1. First key encrypting key KEKla
2. Second key encrypting key KCARa
3. A public and private key pair, PKa and SKa, for use with the public key algorithm.

Having generated the keys, server 130 provides KEKla and KCARa to smart card 120 in step 752. Server 130 then causes PKa and SKa to be initialised within the cryptographic system by requesting appropriate certificates for PKa and making PKa available throughout the network (not shown).

Server 130 then generates an random number RNla in step 753 and combines this with KEKla in step 754 to produce a variant key KEKla+RNla. SKa is then encrypted in step 755 using the variant key to form the encrypted quantity EKEKla+RNla(SKa).

A PIN for user A, PINa, is generated in step 756 along with a hash value POWFa in step 757. PINa is provided to user A in step 758, eg by post, and POWFa is stored on smart card 120 along with user identification data ICARa in step 759.

KCARa, RNla and EKEKla+RNla(SKa) are stored securely in storage 350 in step 760 and the clear values of SKa, KCARa, KEKla and their derivatives are erased from the secure cryptographic environment 360 in step 761.

In embodiments in which there exist in the system more than one server 130 capable of performing public key processing on behalf of user 150, and when it is desired to distribute SKa to each additional server node, the following process can be performed when the server 360 has SKa in a clear form, which is at the time of generation of SKa and whenever the user provides a message to be digitally signed to the server. At this time the server having possession of the clear value of SKa will create an additional RNxa value for the extra server node and prepare an extra enciphered copy of SKa using the same process, 892, 893, and 894, as is used to obtain a local newly enciphered SKa value. Then the server node will send the additional values of RNxa and KCARa, with confidentiality, along with the related enciphered value of SKa to the additional node. All extra values of RNxa and associated enciphered values of SKa are destroyed within the server at the conclusion of this process.

This process will ensure that each additional server node can operate independently with the user with the preservation of the property of non-repudiation.

It will be understood that secure methods exist for distributing cryptographic keys such as KEKla, KCARa and SKa between secure cryptographic servers within a network.

What is claimed is:

1. A communications system in which messages are processed using public key cryptography with a private key unique to one or more users (130) under the control of a portable security device (120) held by the, or each, user, the system comprising:

a server (130) for performing public key processing using the private key;

the server (130) being adapted for data communication with the portable security device (120);

characterised in that the server (130) comprises, or has access to, data storage means in which is stored in a secure manner the private key for the, or each, user in encrypted form only, the private key being encrypted with a key encrypting key, the server comprising secure processing means (360) to receive a message to be processed from the user, retrieve the encrypted private key for the user, decrypt the private key using the key encrypting key, perform the public key processing for the message using the decrypted private key, and delete the key encrypting key and decrypted private key after use, and in that each security device (120) comprises means for storing or generating the key encrypting key and providing the key encrypting key to the server (130) and means for specifying a message to be processed, the system being arranged so that communication of at least the key encrypting key to the server is secure and so that the server can only use the key encrypting key to process the message specified by the user.

2. A system as claimed in claim 1 wherein the key encrypting key is encrypted using a key derived from a second key encrypting key stored in the security device (120), for transmission between the security device and the server, the server (130) comprising, or having access to, data storage means in which the second key encrypting key is stored in a secure manner, whereby communication of the first key encrypting key to the server is secure.

3. A system as claimed in claim 1 wherein the key encrypting key is cryptographically associated with a message to be processed, the secure processing means comprising means to verify the association of the key encrypting key with the message and being arranged only to make use of the key encrypting key to process that message.

4. A system as claimed in claim 3 wherein the security device comprises means to encrypt the key encrypting key for transmission to the server using a key derived from the message to be signed, the server comprising secure means (360) for generating the key derived from the message and decrypting the key encrypting key.

5. A system as claimed in claim 1 wherein the key encrypting key is stored in the security device as a reversible function of a password, the system comprising means to receive from the user (150), and provide to the security device, the password, the security device comprising means to recover the key encrypting key using the reversible function.

6. A system as claimed in claim 1 wherein the key encrypting key is a one-way function of the private key, the server comprising means to check the recovered value of the private key by deriving therefrom the key-encrypting key and comparing the derived value thereof with the value received from the security device.

7. A system as claimed in claim 1 wherein the key encrypting key is a reversible function of a key stored in the security device and a random number, the server (130) comprising means to provide the random number to the security device (120), wherein the server (130) is arranged to reencrypt the private key each time it is used using a new random number, and to provide the new random number to the security device the next time it is required to perform public key processing for a user.

8. A communications system as claimed in claim 1 wherein, the portable security device (120) is adapted to communicate data to a server and comprises means for storing or generating the key encrypting key and providing the key encrypting key to the server (130).

9. A system as claimed in claim 8, wherein the portable security device is in the form of a smart card.

10. A communications system as claimed in claim 1 wherein, the server (130) is adapted for data communications with a portable security device and comprises, or has means to access, secure storage means (350) in which the private key for the, or each, user is stored in encrypted form only, the private key being encrypted with a key encrypting key, the server further comprising secure means (360) to retrieve the encrypted private key for the user, decrypt the private key using the key encrypting key, perform the public key processing using the decrypted private key, and delete the decrypted private key and the key encrypting key after use.

11. A method for processing messages using public key cryptography with a private key unique to one or more users (150) under the control of a portable security device (120) held by the, or each, user, in a system comprising: a server (130) for performing public key processing using the private key, in which system the server (130) is adapted for data communication with the portable security device (120); characterised by the steps of (a) storing in the server, or providing the server with access to, the private key for the, or each, user in encrypted form only, the private key being encrypted with a key encrypting key;

(b) storing or generating in the security device the key encrypting key and providing the key encrypting key to the server (130) in a manner such that at least the key encrypting key is secure in communication to the server; and, in a secure environment in the server (130):

(c) receiving a message to be processed specified by the user;

(d) retrieving the encrypted private key for the user;

(e) verifying that the message was that specified by the user;

(f) decrypting the private key using the key encrypting key;

(g) performing the public key processing for the message using the decrypted private key; and (h) deleting the decrypted private key and the key encrypting key after use.

* * * * *